United States Patent [19]
Heilen et al.

[11] Patent Number: 5,804,099
[45] Date of Patent: Sep. 8, 1998

[54] POLYSILOXANE-POLYOXYETHYLENE-POLYOXYPROPYLENE TRIBLOCK COPOLYMERS AND DEFOAMING COMPOUNDS CONTAINING THEM

[75] Inventors: Wernfried Heilen, Alpen; Hans-Leo Karminski, Essen; Michael Keup, Essen; Otto Klocker, Essen; Stefan Silber, Krefeld; Roland Spiegler, Wiesbaden; Roland Sucker, Werne, all of Germany

[73] Assignee: Th. Goldschmidt AG., Essen, Germany

[21] Appl. No.: 752,510

[22] Filed: Nov. 20, 1996

[30] Foreign Application Priority Data

Nov. 30, 1995 [DE] Germany ............... 195 44 586.4

[51] Int. Cl.$^6$ .................. C08G 77/04; C08G 77/42; B01D 19/04
[52] U.S. Cl. ............... 252/358; 252/321; 528/29; 524/837; 525/476; 525/403; 106/287.13
[58] Field of Search ...................... 252/321, 358; 556/456; 528/29; 524/837; 525/476, 403; 106/287.13

[56] References Cited

U.S. PATENT DOCUMENTS

| | | | |
|---|---|---|---|
| 3,402,192 | 9/1968 | Haluska | 556/437 |
| 3,746,653 | 7/1973 | Churchfield | 252/321 |
| 3,763,021 | 10/1973 | Householder | 252/358 |
| 3,784,479 | 1/1974 | Keil | 252/358 |
| 3,865,544 | 2/1975 | Keil | 252/321 |
| 4,042,528 | 8/1977 | Abe | 252/358 |

FOREIGN PATENT DOCUMENTS

| | | |
|---|---|---|
| 1067003 | 9/1956 | Germany . |
| 1165028 | 11/1962 | Germany . |
| 1914684 | 12/1970 | Germany . |
| 3807247 | 5/1989 | Germany . |

OTHER PUBLICATIONS

Griffin, W.C.; Calculation of HLB Values of Non–Ionic Surfactants, Atlas Powder Company, Wilmington, Del., Journal of the Society of Cosmetic Chemists, 249–256 (May 1954).

Graffin, W.C.; Classification of Surface–Active Agents by "HLB", Atlas Powder Company, Wilmington, Del., Journal of the Society of Cosmetic Chemists, 1, 311–326 (1950) Month Unavailable.

Primary Examiner—Richard D. Lovering
Assistant Examiner—Daniel S. Metzmaier
Attorney, Agent, or Firm—Anderson Kill & Olick, P.C.

[57] ABSTRACT

Polysiloxane-polyoxyethylene-polyoxypropylene triblock copolymers having the general formula:

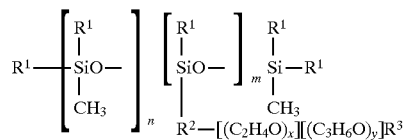

as well as compounds for the defoaming of aqueous dispersion paints that are disclosed contain the copolymers as effective defoaming components.

5 Claims, No Drawings

POLYSILOXANE-POLYOXYETHYLENE-POLYOXYPROPYLENE TRIBLOCK COPOLYMERS AND DEFOAMING COMPOUNDS CONTAINING THEM

FIELD OF THE INVENTION

The invention relates to polysiloxane-polyoxyethylene-polyoxypropylene triblock copolymers and compounds for the defoaming of aqueous dispersion paints, which contain the copolymers as an effective defoamer component.

BACKGROUND OF THE INVENTION AND PRIOR ART

The use of silicone oils, particularly dimethylpolysiloxanes with low to moderate viscosity, for the defoaming of aqueous solutions or dispersions is known and described, for example, in the book by W. Noll, "Chemie und Technologie der Silicone" [Chemistry and Technology of the Silicones]. To improve the defoaming effect of mineral-oil-based and/or silico-organic defoamers, highly dispersed inorganic or organic substances are frequently added, as a rule, pyrogenically produced silicic acids (DE-PS-10 67 003, DE-OS-19 14 684) in particular.

It is also known to use polyoxyalkylene-polysiloxane copolymers as defoaming agents. In U.S. Pat. No. 3,763,021, a preparation for the defoaming of aqueous lattices is described, which consists of (1) 1 to 20 wt % of a siloxane-glycol copolymers having the general formula

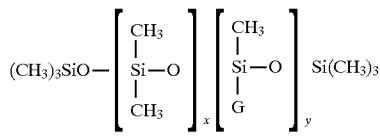

where x has an average value of 6 to 420 and y an average value of 3 to 30, and G denotes a residue having a structure -D(OR)$_z$A, where D is an alkylene group, R consists of ethylene and propylene or butylene groups, with a ratio of ethylene to other alkylene groups such that the ratio of carbon atoms to oxygen atoms in all the OR blocks is from 2.3:1 to 2.8:1, z has an average value of 25 to 100, and A is a terminal group; (2) 65 to 98 wt % of polypropylene glycol with an average molecular weight of 1000 to 2000; and (3) 1 to 15 wt % of a hydrophobic silicon dioxide.

Typical manufacturing methods of these above-mentioned polyoxyalkylene-polysiloxane copolymers are described in U.S. Pat. Nos. 3,402,192, 3,746,653, 3,784,479 and 3,865,544.

DE-PS-38 07 247 contains a description of the use of polyoxyalkylene-polysiloxane block mixed polymers having the general formula $R_1$ OA-(BA)$_m R_1$--where A is a polyoxyalkylene block having the average formula $(C_n H_{2n} O—)_y$, in which n has a value of 2.8 to 4.0 and y has a value of 15 to 100, B is a polysiloxane block with the average formula:

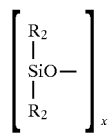

where the $R_2$ groups, which may be identical or different, represent alkyl groups with 1 to 4 carbon atoms or phenyl groups, but at least 90% of $R_2$ are methyl groups and x has a value of 10 to 100; $R_1$ groups, which may be identical or different, represent hydrogen or alkyl groups with 1 to 4 carbon atoms; and m has a value of 4 to 20 for the defoaming of aqueous polymer dispersions, organic substances, particularly dispersions of binding, coating, and adhesive agents.

These preparations, which are known from the state of the art and which contain silicone oils or polyoxyalkylene-polysiloxane copolymers, are suited to varying degrees to prevent the formation of foams of aqueous dispersion paints or to destroy already formed foam. However, it has been shown that aqueous dispersion paints, which are reacted with such preparations, present process-technological drawbacks following the addition of such defoaming agents, which are explained by the addition of these defoaming agents.

In particular, it has been shown that high-gloss dispersion paints, to which polysiloxanes or polyoxyalkylene-polysiloxane copolymers are added for defoaming, present many wetting defects and reduced gloss when applied to certain surfaces. These wetting defects are reflected in uneven wetting of the backlayer and they lead to the formation of layers of uneven thickness and, in extreme cases, to coatings with defective areas of varying sizes.

Using the polyoxyalkylene-polysiloxane block mixed polymers described in DE-PS-38 07 247, precisely these wetting defects are prevented, and it is routine knowledge of a person skilled in the art that the defoaming effect of the dispersion paints with additives decrease over time.

OBJECT OF THE INVENTION

An object of the present invention is to provide polyoxyalkylene-polysiloxane copolymers that present good defoaming action in aqueous dispersion paints, whose effect is maintained over a longer period of time, and which at the same time do not cause any wetting disturbances during the application of these dispersion paints.

Another object of the present invention is a defoamer for aqueous dispersion paints, which contains the inventive copolymers as an effective defoaming agent.

The basis of the invention is surprisingly solved by certain polyoxyalkylene-polysiloxane copolymers, specifically polysiloxane-polyoxyethylene-polyoxypropylene triblock copolymers having the general formula I:

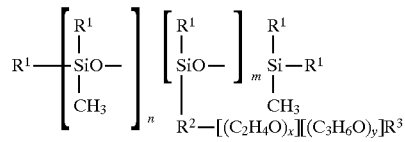

where $R^1$=alkyl group with 1–8 carbon atoms, $R^2$=—(CH$_2$)$_p$O—, where p=2, 3, or 4, $R^3$=hydrogen or alkyl group with 1 to 4 carbon atoms, n=40 to 80, m=3 to 10, x=3 to 6, and y=20 to 30, with the proviso that the x/y ratio is 0.12 to 0.20.

Another object of the invention is a defoamer for the defoaming of aqueous dispersion paints, which contains this polysiloxane-polyoxyethylene-polyoxypropylene triblock copolymer as an effective defoaming component.

An advantageous compound consists of:

a) 72 to 85 parts by weight of a polysiloxane-polyoxyethylene-polyoxypropylene triblock copolymer as described herein.

b) 15 to 28 parts by weight of a nonionic ethoxylating derivative with an HLB value of 8–12, and c) 0.1 to 10.0 wt %, with respect to components a) and b), of an inorganic or organic solid substance.

Of particular importance for the properties of the polysiloxane-polyoxyethylene-polyoxypropylene triblock copolymers used according to the invention in the compounds is the polyoxyalkylene group, where x and y are selected in such a manner that x=3 to 6, y=20 to 30, with the mole ratio x/y however being 0.12 to 0.20 in each case, and with the arrangement of the polyoxyalkylene blocks occurring in blocks in such a manner that in each case the polypropylene oxide block is in the terminal position.

It is standard knowledge for a person skilled in the art that the compounds are in the form of a mixture with an essentially statistical distribution. All indices thus represent mean values. As can be seen in the comparative examples, it was surprisingly found that the ratio of the x and y values, and, particularly, the block-wise construction of the polyoxyethylene and polyoxypropylene fragments, are decisive in determining the fact that the polyoxyalkylene-polysiloxane copolymers contained according to the invention in the preparation will be excellent defoaming agents, whose effectiveness remains guaranteed over a longer period of time, without at the same time causing any wetting defects during the application of dispersion paints that contain the defoaming agent.

As the nonionic surfactant, the preparations according to the invention contain nonionic ethoxylating derivatives, whose HLB value (hydrophilic, lipophilic balance; definition according to W. C. Griffin; J. Soc. Cosmet. Chem., Vol. 1, p. 311, (1950), J. Soc. Cosmet. Chem., Vol. 5, p. 249, (1954)) is 8 to 12. Examples are the fatty acid esters of polyvalent alcohols, their polyethylene glycol derivatives, the polyglycol derivatives of fatty acids and fatty alcohols, and alkylphenol ethoxylates, as well as block polymers made of ethylene oxide and propylene oxide (Pluronics). It is preferred to use ethoxylated derivatives of raw materials used in fat chemistry. Nonionic oleyl and stearyl derivatives are particularly preferred.

Examples of inorganic solids are silicic acid, aluminum oxide, alkaline earth metal carbonates, or similar finely divided standard solid substances, which are optionally made hydrophobic, known from the state of the art. As finely divided organic substances, it is possible to use alkaline earth metal salts of long-chained fatty acids with 12 to 22 carbon atoms or the amides of these fatty acids, which are known for this purpose.

The preparations according to the invention can be used as such or in the form of aqueous emulsions. In this context, the use of emulsions is preferred due to the better dosage possibilities. Defoaming emulsions with an average particle size of 1–10 μm are particularly preferred. In particular, aqueous emulsions are used with a content of 5 to 50% of the polysiloxane-polyoxyethylene-polyoxypropylene triblock copolymer.

Examples of polysiloxane-polyoxyethylene-polyoxypropylene triblock copolymers according to the invention, which are particularly suitable as defoamers, are

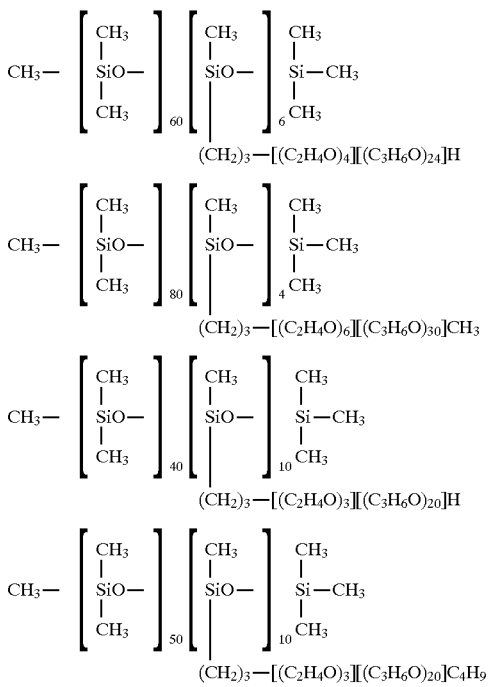

These polyoxyalkylene-polysiloxane copolymers are prepared by the addition of block-wise constructed polyoxyalkylene ethers of olefinically unsaturated alcohols such as, allylpolyoxyalkylene ethers, in corresponding hydrogen siloxanes. This reaction is catalyzed by platinum compounds and is described, for example, in DE-PS-11 65 028.

One can use any contents of free polyoxyalkylene glycols or their monoethers or monoesters, that can be contained, as a result of the preparation, in the compounds to be used according to the invention; they do not have to be separated from the product.

The compounds according to the invention are added, as a defoamer, to the dispersion paints in quantities of 0.01 to 0.50 wt %, with respect to the total paint formulation.

The polyoxyalkylene-polysiloxane (co)polymers that are to be tested, and which are either used in preparations according to the invention or preparations that are not according to the invention, correspond to general formula I. Here, $R^1$ group represents methyl, $R^2$ represents propoxy, and $R^3$ as well as the indices n, m, x, and y have the meanings or values indicated in the table below. In each case, 5% silicic acid is added as a solid substance. It is understood that the following examples are provided by way of illustration and not by way of limitation.

| Preparation | R3 | n | m | x | y | x/y | Structure of the Polyether | Wt % Polyether Siloxane | Wt % Ethoxylation Derivative | Type | HLB | Wt % Solid substance |
|---|---|---|---|---|---|---|---|---|---|---|---|---|
| 1 | H | 60 | 6 | 4 | 24 | 0.17 | Block, PPO end | 75 | 20 | PEO-oleate | 10 | 5 |
| 2 | Methyl | 80 | 4 | 6 | 30 | 0.2 | Block, PPO end | 80 | 15 | PEO-stearyl alcohol | 12 | 5 |
| 3 | H | 40 | 10 | 3 | 20 | 0.15 | Block, PPO end | 75 | 22 | PEO-lauryl alcohol | 10 | 3 |
| 4 | Butyl | 50 | 10 | 3 | 20 | 0.15 | Block, PPO end | 75 | 20 | PEO-oleate | 20 | 5 |

-continued

| Preparation | R3 | n | m | x | y | x/y | Structure of the Polyether | Wt % Polyether Siloxane | Wt % Ethoxylation Derivative | Type | HLB | Wt % Solid substance |
|---|---|---|---|---|---|---|---|---|---|---|---|---|
| 5 | H | 60 | 6 | 4 | 24 | 0.17 | Block, PEO end | 75 | 20 | PEO-oleate | 10 | 5 |
| 6 | H | 60 | 6 | 4 | 24 | 0.17 | Statistical | 75 | 20 | PEO-oleate | 10 | 5 |
| 7 | H | 60 | 6 | 6 | 18 | 0.33 | Block, PPO end | 75 | 20 | PEO-oleate | 10 | 5 |
| 8 | H | 60 | 6 | 0 | 18 | 0 | PPO | 75 | 20 | PEO-oleate | 10 | 5 |

PEO = Polyethylene oxide
PPO = Polypropylene oxide

As additional examples according to the invention, emulsions 9 and 10 are prepared from self-emulsifiable preparations 1 and 2. Their manufacture occurs in a manner that in itself is known by stirring the preparation and the aqueous solution of a polyacrylate-based neutralized thickener for 15 min using a disk stirrer.

The preparation, according to the invention, 9 is characterized in that it represents a 20% aqueous emulsion of preparation 1 with a mean particle diameter of 2 μm. The preparation 10, which is also according to the invention, is characterized in that it represents a 40% emulsion of the separation 2 with a mean particle diameter of 5 μm.

Below, the application technological properties of the different preparations according to the invention and of the comparative examples are indicated.

To verify the application technological properties, the following dispersion paint formulations are selected (quantities indicated in wt %):

| Formulations 1–5: | | |
|---|---|---|
| Dispersion paint 1 | | |
| Propylene glycol | 4.8 | |
| Collacral AS35 | 5.0 | BASF, wetting agent and dispersant |
| Titanium dioxide | 23.2 | |
| Mergal K7 | 0.2 | Riedel de Haen, preservation agent |
| Butyl glycol | 2.6 | |
| Dowanol DPM | 1.4 | |
| Water | 6.9 | |
| Acronal A603 | 54.3 | BASF, pure acrylate dispersion |
| Rheolate 278 | 4.0 | Rheox, thickener |
| Dispersion Paint 2 | | |
| Water | 36.4 | |
| Coatex P50 | 0.4 | Coatex, dispersant |
| Calgon N | 0.1 | BK Ladenburg, dispersant |
| Mergal K7 | 0.2 | |
| Coatex BR100 | 2.3 | Coatex, PU-thickener |
| Calcidar Extra | 22.1 | Omya, filler |
| Titanium dioxide | 17.5 | |
| Finntalc M15 | 4.7 | |
| NaOH, 10% | 0.1 | |
| Acronal 290D | 16.2 | BASF, styrene acrylate dispersion |
| Dispersion paint 3 | | |
| Water | 2.3 | |
| Propylene glycol | 5.0 | |
| Orotan 681 | 1.2 | Rohm & Haas, dispersant |
| Titanium dioxide | 21.2 | |
| Ethyl diglycol | 2.0 | |
| Dowanol DPnB | 1.3 | |
| Primal 2595 | 56.0 | Rohm & Haas, acrylate dispersion |
| Acrysol RM1020 | 4.4 | Rohm & Haas, thickener |
| Acrysol RM8 | 0.4 | Rohm & Haas, thickener |
| Tilcom AT23 | 0.3 | Tioxide Chemicals, thixotropic agent |
| Triton GR5M | 0.1 | Rohm & Haas, wetting agent |
| Water | 5.8 | |
| Dispersion paint 4 | | |
| Mowolith DM123 | 51.6 | Hoechst, PVAC copolymer |
| Ammonia, 25% | 0.2 | |
| Tylose H4000p, 2% | 20.2 | Hoechst, thickener |
| Calgon N, 10% | 0.6 | |
| Titanium dioxide | 17.0 | |
| Hydrocarb 90 | 8.0 | Omya, filler |
| Parmetol A23 | 0.2 | Schülke & Mayr, preservation agent |
| Butyl diglycol acetate | 1.0 | |
| Texanol | 1.2 | |
| Dispersion paint 5 | | |
| Water | 8.0 | |
| Acrysol, RM-2020, 20% | 1.6 | |
| Orotan 731 K | 1.1 | Rohm & Haas, dispersant |
| Triton CA | 0.4 | Rohm & Haas, wetting agent |
| Calgon N | 0.2 | |
| Titanium dioxide | 15.5 | |
| Finntalc M15 | 3.7 | Filler |
| Millicarb | 7.3 | Filler |
| Water | 2.0 | |
| Primal SF-012 | 39.4 | Rohm & Haas, styrene acrylate dispersion |
| Ropaque OP-62 LO-E | 6.4 | |
| Acrysol RM2020, 20% | 3.2 | Rohm & Haas, thickener |
| Water | 11.0 | |
| Acrysol ASE-60, 30% | 0.2 | Rohm & Haas, thickener |

The dispersion paints are made in the usual manner according to the above-indicated formulations. All components are used in the form in which they are supplied. The last formulation component added in each case is the corresponding defoamer preparation. The incorporation is carried out at 1000 rpm for 1 min.

The effectiveness of the preparations according to the invention is tested using the roller test described below. The results are represented in the following tables.

Roller test

The so-called roller test approximates the practical conditions relatively closely, so that a good differentiation between the different defoaming preparations is possible, also in view of the concentrations to be used.

In the roller test, an open-pore foam roller is used to distribute 40 g of the dispersion paint to be examined onto a nonabsorbing test card with a total surface area of 500 cm². The foam roller is wetted before the paint application. In this process, care is always taken to introduce the same quantity of water into the paint, and thus the drying time of the lacquer always remains the same. The wet film application covers approximately 300 g/m². After 24 h of drying the film, the test cards are examined with regard to the macrofoam present (number of bubbles per 100 cm$^2$), the microfoam present (number of needle holes by a comparison with test cards with pictures of disturbances of varying levels, on a scale from 1 (very good) to 5 (defective, many needle holes)), and with respect to any wetting defects.

These tests are repeated with dispersion paints containing additives, which were stored for 6 weeks at 50° C.

| Preparation | Concentration | Macrofoam | | Microfoam | | Wetting Defect | |
|---|---|---|---|---|---|---|---|
| | | 0 Weeks | 6 Weeks | 0 Weeks | 6 Weeks | 0 Weeks | 6 Weeks |
| Results of the roller test with dispersion paint 1 | | | | | | | |
| Blank | 0 | 80 | 80 | 5 | 5 | None | None |
| 1 | 0.06 | 0 | 3 | 1 | 1 | None | None |
| 2 | 0.06 | 0 | 2 | 1 | 1 | None | None |
| 3 | 0.06 | 0 | 5 | 1 | 1 | None | None |
| 4 | 0.06 | 0 | 2 | 1 | 1 | None | None |
| 5 | 0.06 | 55 | 70 | 3 | 3 | Slight | Slight |
| 6 | 0.06 | 30 | 45 | 2 | 3 | None | Slight |
| 7 | 0.06 | 43 | 72 | 4 | 4 | None | Slight |
| 8 | 0.06 | 5 | 13 | 1 | 2 | Slight | Strong |
| 9 | 0.30 | 0 | 2 | 1 | 1 | None | None |
| 10 | 0.15 | 0 | 7 | 1 | 2 | None | None |
| Results of the roller test with dispersion paint 2 | | | | | | | |
| Blank | 0 | 50 | 50 | 4 | 4 | None | None |
| 1 | 0.06 | 0 | 3 | 1 | 1 | None | None |
| 2 | 0.06 | 2 | 3 | 1 | 1 | None | None |
| 3 | 0.06 | 1 | 1 | 1 | 1 | None | None |
| 4 | 0.06 | 0 | 2 | 1 | 1 | None | None |
| 5 | 0.06 | 40 | 46 | 3 | 4 | Slight | Slight |
| 6 | 0.06 | 23 | 30 | 2 | 3 | None | Slight |
| 7 | 0.06 | 36 | 44 | 3 | 4 | None | Slight |
| 8 | 0.06 | 5 | 7 | 1 | 2 | Slight | Strong |
| 9 | 0.30 | 0 | 2 | 1 | 1 | None | None |
| 10 | 0.15 | 0 | 7 | 1 | 1 | None | None |
| Results of the roller test with dispersion paint 3 | | | | | | | |
| Blank | 0 | 40 | 40 | 3 | 3 | None | None |
| 1 | 0.06 | 0 | 1 | 1 | 1 | None | None |
| 2 | 0.06 | 1 | 1 | 1 | 1 | None | None |
| 3 | 0.06 | 0 | 1 | 1 | 1 | None | None |
| 4 | 0.06 | 0 | 0 | 1 | 1 | None | None |
| 5 | 0.06 | 32 | 38 | 2 | 4 | Slight | Slight |
| 6 | 0.06 | 14 | 22 | 2 | 3 | None | Slight |
| 7 | 0.06 | 21 | 28 | 3 | 3 | Slight | Slight |
| 8 | 0.06 | 2 | 3 | 2 | 2 | Slight | Strong |
| 9 | 0.30 | 0 | 2 | 1 | 1 | None | None |
| 10 | 0.15 | 0 | 3 | 1 | 1 | None | None |
| Results of the roller test with dispersion paint 4 | | | | | | | |
| Blank | 0 | 180 | 180 | 5 | 5 | None | None |
| 1 | 0.06 | 3 | 5 | 2 | 2 | None | None |
| 2 | 0.06 | 4 | 4 | 2 | 2 | None | None |
| 3 | 0.06 | 6 | 8 | 2 | 2 | None | None |
| 4 | 0.06 | 2 | 8 | 2 | 2 | None | None |
| 5 | 0.06 | 143 | 160 | 4 | 5 | Slight | Slight |
| 6 | 0.06 | 23 | 28 | 3 | 5 | None | Slight |
| 7 | 0.06 | 97 | 135 | 4 | 5 | Slight | Slight |
| 8 | 0.06 | 5 | 15 | 3 | 3 | Slight | Strong |
| 9 | 0.30 | 2 | 5 | 2 | 2 | None | None |
| 10 | 0.15 | 3 | 4 | 2 | 2 | None | None |
| Results of the roller test with dispersion paint 5 | | | | | | | |
| Blank | 0 | 20 | 20 | 5 | 5 | None | None |
| 1 | 0.06 | 3 | 5 | 1 | 1 | None | None |
| 2 | 0.06 | 4 | 5 | 1 | 1 | None | None |
| 3 | 0.06 | 3 | 5 | 1 | 1 | None | None |
| 4 | 0.06 | 2 | 3 | 1 | 1 | None | None |
| 5 | 0.06 | 16 | 20 | 4 | 5 | Slight | Slight |
| 6 | 0.06 | 8 | 12 | 3 | 4 | None | Slight |
| 7 | 0.06 | 15 | 19 | 4 | 5 | Slight | Slight |
| 8 | 0.06 | 3 | 9 | 3 | 3 | Slight | Strong |
| 9 | 0.30 | 2 | 4 | 1 | 1 | None | None |
| 10 | 0.15 | 3 | 5 | 1 | 1 | None | None |

As can be seen from the preceding tables, the preparations according to the invention are characterized by their universal applicability and they can be used with a very great number of paint formulations.

What is claimed is:

1. Polysiloxane-polyoxyethylene-polyoxypropylene triblock copolymers having a general formula:

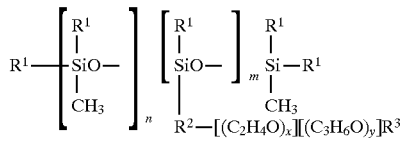

where
$R^1$=alkyl group with 1 to 8 carbon atoms,
$R^2$=—$(CH_2)_pO$—, where p=2, 3, or 4,
$R^3$=hydrogen or alkyl group with 1 to 4 carbon atoms,
n=40 to 80,
m=3 to 10,
x=3 to 6, and
y=20 to 30,
with the proviso that the x/y ratio is about 0.12 to 0.20.

2. A defoamer for defoaming aqueous dispersion paints, containing a polysiloxane-polyoxyethylene-polyoxypropylene triblock copolymer according to claim 1 as an effective defoaming component.

3. A defoamer for defoaming aqueous dispersion paints, consisting essentially of:
   a) 72 to 85 parts by weight of a polysiloxane-polyoxyethylene-polyoxypropylene triblock copolymer according to claim 1;
   b) 15 to 28 parts by weight of a nonionic ethoxylated surfactant with an HLB value of 8 to 12; and
   c) 0.1 to 10.0 wt %, with respect to the components a) and b), of an inorganic or organic solid substance.

4. A defoamer according to claim 3 in the form of an aqueous emulsion.

5. A defoamer according to claim 4, wherein the mean particle size of the emulsion is 1–10 μm.

* * * * *